3,080,431
**PROCESS FOR THE PRODUCTION OF
ALKYL HALIDES**
Albrecht Zappel, Koln-Stammheim, and Heinz Jonas, Leverkusen, Germany, assignors to Farbenfabriken Bayer Aktiengesellschaft, Leverkusen, Germany, a corporation of Germany
No Drawing. Filed Dec. 19, 1960, Ser. No. 76,496
Claims priority, application Germany Dec. 24, 1959
8 Claims. (Cl. 260—653)

It is known to produce alkyl halides by the thermal decomposition of halogenated sulphonic acid esters. However, black, tarry, undistillable products are invariably obtained. The formation of these undistillable products is due to the oxidizing action of the sulphur trioxide which is liberated during the decomposition.

The present invention relates to a process for the production of alkyl halides by the thermal splitting of halogenated sulphonic acid esters. In the process according to the present invention the splitting of the halogenated sulphonic acid ester is carried out in the presence of a substance, such as an alkali metal halide as e.g. KCl, KF, NaCl, NaF, which will take up the sulphur trioxide which is formed during the decomposition.

The efficiency of the added substance depends on the $SO_2$ content of the gaseous reaction product. The higher the proportion of $SO_2$, the stronger is the decomposition of the organic component. The gas formed by the thermal decomposition of fluorosulphonic acid ethyl ester without additions consists in many cases of $SO_2$ and a small quantity of ethylene. On the other hand, $SO_2$ can only just be detected if the decomposition of the halogenated e.g. fluorosulphonic acid alkyl ester is carried out in the presence of potassium fluoride or another alkali metal halide. The $SO_3$ which is formed is immediately combined by the potassium fluoride to form potassium fluorosulphonate. Alkali metal fluorides and chlorides are particularly suitable for employment in the process according to the present invention as substances for taking up $SO_3$. As starting materials especially the lower alkyl esters such as methyl, ethyl, isopropyl and n-propyl fluoro and chloro esters come into consideration. The halogenated sulphonic acid esters may be prepared by various methods. Chlorosulphonic acid ethyl ester, for example, may be conveniently prepared by the partial alkoxylation of sulphuryl chloride. Fluorosulphonic acid esters may be prepared by the fluorination of the corresponding chlorine derivatives, preferably by means of NaF or by splitting off ether with fluorosulphonic acid by the method of J. Meyer and G. Schramm described in Z. f. anorg. Chem. 206, 24 (1932).

The invention is further illustrated by the following examples.

*Example 1*

0.1 mol of fluorosulphonic acid methyl ester was heated at 180° C. for 1 hour with 0.5 mol of KF in a tubular autoclave having a capacity of 250 ml. The yield of $CH_3F$ was 82 percent. $SO_2$ was present in an amount of only 2 percent of the total conversion. The solid residue consisted of a mixture of KF and $KFSO_3$.

*Example 2*

0.3 mol of chlorosulphonic acid ethyl ester was heated at 150° C. in the absence of additives. Sudden decomposition of the ethyl chlorosulphonic acid ethyl ester occurred after 45 minutes. The temperature then rose spontaneously to 210° C. 50 percent by weight of the weighed portion were recovered in the form of tarry residue. The gases formed were collected and analyzed. 41 percent of the sulphur introduced in the hexavalent state was present as $SO_2$. Up to 36 percent of ethylene and up to 66 percent of HCl were formed. The yield of ethyl chloride was only 6 percent.

*Example 3*

0.2 mol of chlorosulphonic acid ethyl ester was heated at 150° C. for 4 hours in the presence of 0.5 mol of KCl. The yield of $C_2H_5Cl$ was 65 percent. $SO_2$ could not be detected in the gas which was collected. About 5 percent of the total reaction was taken up with the splitting of ethyl chloride into $C_2H_4$ and HCl. This experiment was repeated; the ethyl chlorosulphonic acid ethyl ester being heated at 150° C. for 5 hours in the presence of 0.5 mol of KCl. The yield of $C_2H_5Cl$ in this case was 86 percent.

*Example 4*

0.2 mol of chlorosulphonic acid ethyl ester was heated at 180° C. for 1½ hours in the presence of 0.5 mol of NaCl. The result of the experiment was as follows: 48.6 percent undecomposed, 42 percent split into $C_2H_5Cl$ and 4 percent into $C_2H_4$. $SO_2$ could not be detected.

*Example 5*

(a) 0.15 mol of fluorosulphonic acid ethyl ester was boiled for 1 hour under reflux. Sump temperature 115–120° C. No decomposition occurred.

(b) The procedure was as described in Example 5a with the exception that the fluorosulphonic acid ethyl ester was boiled in the presence of a small quantity of mercury in order to accelerate the decomposition. 20 percent of the batch was recovered. Up to 31 percent of ethylene and up to 3 percent of $C_2H_5F$ were formed. 56 percent of the sulphur introduced in the hexavalent state was recovered as $SO_2$. The residue consisted of a tar-like mass.

(c) The procedure was as described in Example 5a with the exception that the fluorosulphonic acid ethyl ester was boiled in the presence of 0.5 mol of KF. After heating for one hour at 120° C. sump temperature (reflux), 65 percent of the fluorosulphonic acid ethyl ester was still undecomposed; 18.6 percent of the batch was decomposed into $C_2H_5F$ and 1.5 percent into $C_2H_4$. Only traces of $SO_2$ were formed.

(d) The procedure was as described in Example 5a with the exception that the fluorosulphonic acid ethyl ester was heated in the presence of 0.5 mol of KF and a small quantity of mercury. After heating for 30 minutes at 120° C., $C_2H_5F$ was formed in a yield of 50 percent, and the proportion of $C_2H_5$ was 10 percent, based on the fluorosulphonic acid ethyl ester employed. The $SO_2$ content was 2 percent.

*Example 6*

0.15 mol of fluorosulphonic acid ethyl ester was heated in the presence of 0.5 mol of NaF for 2 hours at a sump temperature of 120° C. The result of the experiment was as follows: 31 percent undecomposed, 8.4 percent of $OS(OC_2H_5)_2$—by disproportionation of $FSO_2OC_2H_5$—16.6 percent of $C_2H_5F$ and 7 percent of $C_2H_4$. $SO_2$ could not be detected.

We claim:

1. In the process for preparing alkyl halides by the thermal decomposition of a halogen sulfonic acid ester, the improvement which comprises heating a halogen sulfonic acid ester at a temperature of between 100–300° C. in the presence of an alkali metal halide capable of combining with the sulfur trioxide formed in the thermal decomposition.

2. Improvement according to claim 1, wherein said alkali metal halide is potassium fluoride.

3. Improvement according to claim 1, wherein said alkali metal halide is sodium chloride.

4. In the process for preparing lower alkyl fluorides by thermal decomposition of fluorosulfonic alkyl esters, the improvement which comprises heating a fluorosulfonic alkyl ester to a temperature of between 100–200° C. in the presence of an alkali metal halide capable of combining with the sulfur trioxide formed in the thermal decomposition.

5. Process according to claim 4, wherein said alkali metal halide is selected from the group consisting of sodium fluoride and potassium fluoride.

6. In the process for preparing ethyl chloride by thermal decomposition of chlorosulfonic ethyl ester, the improvement which comprises heating cholorosulfonic ethyl ester at a temperature of about 150° C. in the presence of potassium chloride.

7. In the process for preparing methyl fluoride by thermal decomposition of fluorosulfonic acid methyl ester, the improvement which comprises heating fluorosulfonic acid methyl ester, the improvement which comprises heating fluorosulfonic acid methyl ester at a temperature of between 100–200° C. in the presence of an alkali metal halide selected from the group consisting of sodium fluoride and potassium fluoride.

8. In the process for preparing ethyl fluoride by thermal decomposition of fluorosulfonic acid ethyl ester, the improvement which comprises heating fluorosulfonic acid ethyl ester at a temperature of between 100–200° C. in the presence of an alkali metal halide selected from the group consisting of sodium fluoride and potassium fluoride.

References Cited in the file of this patent

UNITED STATES PATENTS

| | | |
|---|---|---|
| 1,470,656 | Traube | Oct. 16, 1923 |
| 2,263,666 | Wilson | Nov. 25, 1941 |
| 2,770,659 | Barnhart | Nov. 13, 1956 |